US010093144B2

(12) United States Patent
Frank et al.

(10) Patent No.: US 10,093,144 B2
(45) Date of Patent: *Oct. 9, 2018

(54) COMPRESSED AIR SUPPLY INSTALLATION AND PNEUMATIC SYSTEM

(71) Applicant: WABCO GmbH, Hannover (DE)

(72) Inventors: Dieter Frank, Hannover (DE); Frank Meissner, Hannover (DE); Uwe Stabenow, Laatzen (DE)

(73) Assignee: WABCO GmbH, Hannover (DE)

( * ) Notice: Subject to any disclaimer, the term of this patent is extended or adjusted under 35 U.S.C. 154(b) by 5 days.

This patent is subject to a terminal disclaimer.

(21) Appl. No.: 15/594,664

(22) Filed: May 15, 2017

(65) Prior Publication Data
US 2017/0246928 A1    Aug. 31, 2017

Related U.S. Application Data

(63) Continuation of application No. 13/993,839, filed as application No. PCT/EP2011/005863 on Nov. 22, 2011, now Pat. No. 9,694,801.

(30) Foreign Application Priority Data

Dec. 16, 2010    (DE) .................. 10 2010 054 712

(51) Int. Cl.
*B60T 13/68*    (2006.01)
*B60T 17/02*    (2006.01)
(Continued)

(52) U.S. Cl.
CPC .......... *B60G 17/0528* (2013.01); *B60G 11/27* (2013.01); *B60G 17/0523* (2013.01);
(Continued)

(58) Field of Classification Search
CPC ........ B60G 17/0523; B60G 2500/2021; B60G 2500/204; B60G 2600/26;
(Continued)

(56) References Cited

U.S. PATENT DOCUMENTS 4,756,548 A    7/1988    Kaltenthaler et al.
4,809,957 A    3/1989    Schonfeld et al.
(Continued)

FOREIGN PATENT DOCUMENTS

DE    3216329 C2    9/1986
DE    3533893 A1    3/1987
(Continued)

OTHER PUBLICATIONS

U.S. Appl. No. 13/993,839, filed Jun. 13, 2013.

*Primary Examiner* — Atif Chaudry
(74) *Attorney, Agent, or Firm* — Leydig, Voit & Mayer, Ltd.

(57) ABSTRACT

A compressed air supply installation for operating an air suspension installation of a vehicle includes an air supply unit configured to supply air, an air compression unit configured to compress air, a bleeding line, and a compressed air supply line. The bleeding line includes a bleeding valve arrangement in the form of a controllable solenoid valve arrangement comprising a magnetic part and a pneumatic part actuatable directly via the magnetic part, and a bleeding port for bleeding air. The compressed air supply line includes an air dryer, and a compressed air port for supplying the pneumatic installation with compressed air. The pneumatic part is open in an unactivated state of the magnetic part of the solenoid valve arrangement. The pneumatic part is open in a branch line of the compressed air supply line between a pressure-side valve port and a control-side valve port of the branch line.

17 Claims, 7 Drawing Sheets

(51) Int. Cl.
  *B60G 17/052* (2006.01)
  *B60G 11/27* (2006.01)
  *B60T 17/00* (2006.01)
(52) U.S. Cl.
  CPC .......... *B60T 13/683* (2013.01); *B60T 17/004* (2013.01); *B60T 17/02* (2013.01); *B60G 2500/201* (2013.01); *B60G 2500/203* (2013.01); *B60G 2500/204* (2013.01); *B60G 2500/2021* (2013.01); *B60G 2500/2044* (2013.01); *B60G 2500/302* (2013.01); *B60G 2600/26* (2013.01); *Y10T 137/264* (2015.04)
(58) Field of Classification Search
  CPC .......... B60G 2500/203; B60G 17/0528; B60G 2500/302; B60T 17/004; B60T 17/02; B60T 13/683; Y10T 137/264
  See application file for complete search history.

(56) References Cited

U.S. PATENT DOCUMENTS

| | | | |
|---|---|---|---|
| 6,074,177 A | 6/2000 | Kobayashi et al. | |
| 6,098,967 A | 8/2000 | Folchert | |
| 6,540,308 B1 | 4/2003 | Hilberer | |
| 6,694,933 B1 | 2/2004 | Lester | |
| 6,698,778 B2 | 3/2004 | Roemer et al. | |
| 6,726,224 B2 | 4/2004 | Jurr et al. | |
| 6,824,145 B2 | 11/2004 | Behmenburg | |
| 6,994,406 B1* | 2/2006 | Krawczyk | B60T 8/363 251/129.02 |
| 7,255,358 B2 | 8/2007 | Kim | |
| 7,832,813 B2 | 7/2010 | Bensch et al. | |
| 8,290,679 B2 | 10/2012 | Bensch et al. | |
| 8,297,714 B2 | 10/2012 | Bensch et al. | |
| 8,708,430 B2 | 4/2014 | Bensch et al. | |
| 8,794,718 B2 | 8/2014 | Bensch et al. | |
| 9,694,801 B2* | 7/2017 | Frank | B60G 17/0523 |
| 2001/0050347 A1 | 12/2001 | Otsuka et al. | |
| 2002/0070523 A1 | 6/2002 | Roemer et al. | |
| 2002/0153688 A1* | 10/2002 | Jurr | B62D 6/04 280/90 |
| 2004/0055564 A1 | 3/2004 | Crowell et al. | |
| 2007/0096554 A1* | 5/2007 | Detlefs | B60T 17/02 303/127 |
| 2009/0127926 A1 | 5/2009 | Fries et al. | |
| 2009/0280959 A1 | 11/2009 | Bensch et al. | |
| 2009/0309413 A1 | 12/2009 | Bensch et al. | |
| 2010/0072810 A1 | 3/2010 | Bensch et al. | |
| 2010/0187902 A1 | 7/2010 | Bensch et al. | |

FOREIGN PATENT DOCUMENTS

| | | |
|---|---|---|
| DE | 3542974 A1 | 6/1987 |
| DE | 3919438 A1 | 12/1990 |
| DE | 19700243 C1 | 4/1998 |
| DE | 19724747 C1 | 6/1998 |
| DE | 19821420 C1 | 10/1999 |
| DE | 19835638 A1 | 2/2000 |
| DE | 10055108 A1 | 5/2002 |
| DE | 19911933 B4 | 2/2004 |
| DE | 102006036748 A1 | 2/2008 |
| DE | 102006041008 A1 | 3/2008 |
| DE | 102006041010 A1 | 3/2008 |
| DE | 102006041012 A1 | 3/2008 |
| DE | 102007008504 A1 | 8/2008 |
| DE | 102007051150 A1 | 11/2008 |
| DE | 102007050151 A1 | 4/2009 |
| DE | 102008007877 B3 | 11/2009 |
| EP | 1508488 A1 | 2/2005 |
| EP | 1165333 B2 | 6/2006 |
| EP | 1233183 B1 | 11/2006 |
| EP | 1386811 B1 | 9/2011 |
| EP | 2338754 B1 | 5/2013 |

* cited by examiner

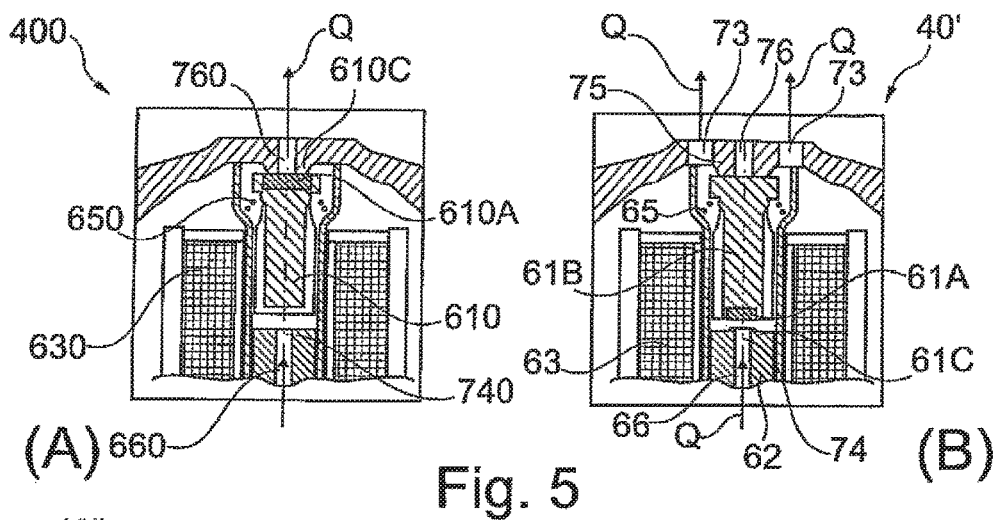
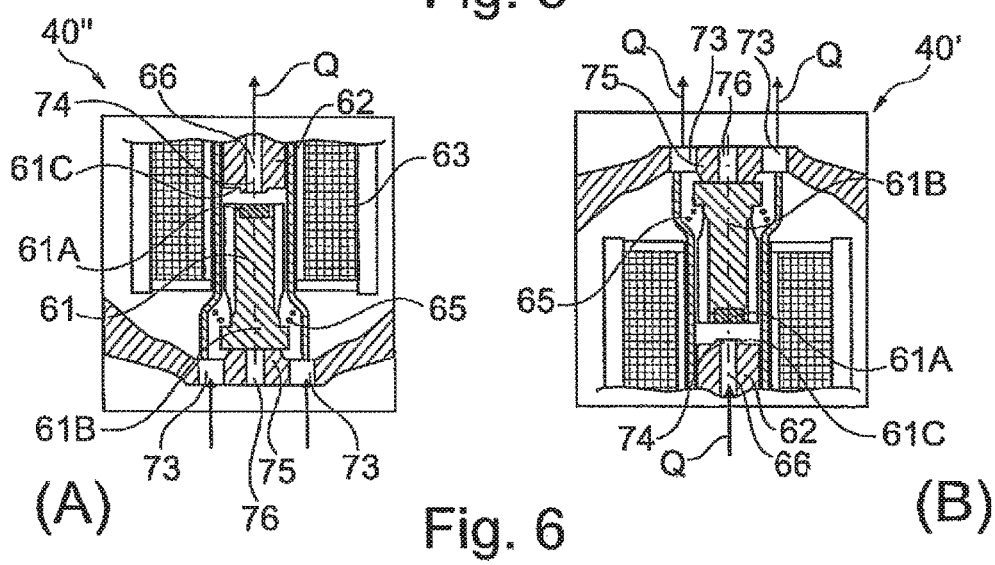
Fig. 5
Fig. 6
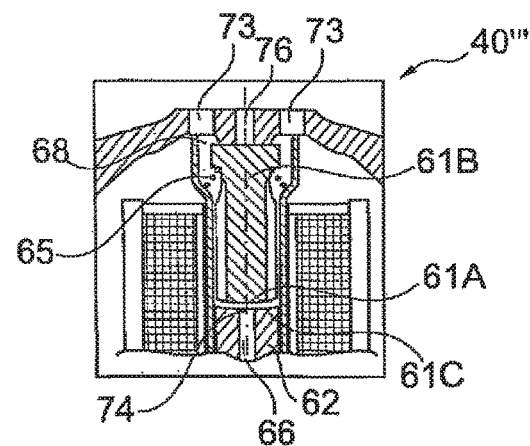
Fig. 7

COMPRESSED AIR SUPPLY INSTALLATION AND PNEUMATIC SYSTEM

CROSS REFERENCE TO RELATED APPLICATIONS

This application is continuation of U.S. patent application Ser. No. 13/993,839, filed on Jun. 13, 2013, which is a U.S. National Phase application under 35 U.S.C. § 371 of International Application No. PCT/EP2011/005863 (WO 2012/079688), which was filed on Nov. 22, 2011 and which claims benefit to German Patent Application No. DE 10 2010 054 712.3, filed on Dec. 16, 2010.

DETAILED DESCRIPTION

The invention relates to a compressed air supply installation according to the preamble of claim 1. The invention also relates to a pneumatic system according to the preamble of claim 14 comprising such a compressed air supply installation, and to a method according to the preamble of claim 15 for operating a pneumatic installation.

A compressed air supply installation is used in vehicles of all types, in particular to supply compressed air to an air suspension installation of a vehicle. Air suspension installations may also comprise level control devices, with which the spacing between the vehicle axle and the vehicle body can be adjusted. An air suspension installation of a pneumatic system as mentioned in the introduction comprises a number of air bellows, which are pneumatically connected to a common line (gallery) and can lift the vehicle body when increasingly filled and can accordingly lower the vehicle body when decreasingly filled. With growing spacing between the vehicle axle and the vehicle body or ground clearance, the suspension travels are longer, and greater ground unevennesses can also be overcome without resulting in contact with the vehicle body. Such systems are used in off-road vehicles and sport utility vehicles (SUVs). In particular in the case of SUVs, it is desirable with very powerful motors to provide the vehicle with relatively small ground clearance for high speeds on the road and also with a relatively large ground clearance for off-road. It is also desirable to change the ground clearance as quickly as possible, which increases the demands in terms of speed, flexibility and reliability of a compressed air supply installation.

A compressed air supply installation for use in a pneumatic system comprising a pneumatic installation, for example an air suspension installation as previously described, is operated with compressed air from a compressed air supply unit, for example within the scope of a pressure level from 5 to 20 bar. The compressed air is made available to the compressed air supply unit by means of an air compression unit (compressor). The compressed air supply unit is pneumatically connected to a compressed air port in order to supply the pneumatic installation and is also pneumatically connected to a bleeding port. The compressed air supply installation can be bled toward the bleeding port via a bleeding valve arrangement by draining air.

To ensure long-term operation of the compressed air supply installation, said installation has an air dryer, with which the compressed air is to be dried. The collection of moisture in the pneumatic system is thus avoided, which, at comparatively low temperatures, may lead to valve-damaging crystal formation and may also lead to undesired defects in the compressed air supply installation and in the pneumatic installation. An air dyer has a drying means, normally a granulate packed bed, through which the compressed air can flow so that the granulate packed bed (at comparatively high pressure), by means of adsorption, can take on moisture contained in the compressed air. An air dryer may optionally be designed as a regenerative air dryer. This is achieved as a result of the fact that, during each bleeding cycle (at comparatively low pressure), the dried compressed air from the air suspension system flows through the granulate packed bed in counter flow or co-current flow relative to the filling direction. The bleeding valve arrangement can be opened for this purpose. For such an application (also referred to as pressure swing adsorption), it has proven to be desirable to design a compressed air supply installation in a versatile and at the same time reliable manner, in particular to enable relatively quick bleeding with a pressure swing that is still sufficient for regeneration of the air dryer.

A compressed air supply installation of the type mentioned in the introduction for a level control device for vehicles with air suspensions is known from DE 35 429 74 A1, in the name of the applicant, with which a predefined spacing of the vehicle frame from the vehicle axle can be maintained in accordance with the vehicle load by filling up or emptying the air suspensions. The device contains a normally closed solenoid bleeding valve and a safety valve controllable by the pressure in the air suspensions. Such a compressed air supply installation can be improved further.

DE 199 11 933 B4 discloses a compressed air generator comprising an air dryer with a first compressed air supply line, wherein the compressed air is guided through a drying agent, and comprising a second compressed air supply line without guiding the compressed air through the drying agent.

A compressed air supply installation as mentioned in the introduction is also disclosed in EP 1 165 333 B2 within the scope of a pneumatic system as mentioned in the introduction comprising an air suspension installation. Besides a main bleeding line that can be shut off separately, said compressed air supply installation has a high-pressure bleeding line, which has an additional high-pressure bleeding valve besides the main bleeding valve in the main bleeding line controlled pneumatically by a control valve, and is connected in parallel to the main bleeding line. The free flow cross section of the separate high-pressure bleeding valve is smaller than that of the main bleeding valve. Such a compressed air supply installation can be improved further. It has been found that, when bleeding such a compressed air supply installation via the high-pressure bleeding line, dry air is bled, which is not used for the regeneration of the drying agent. This amounts to an unnecessary waste of dry air, in particular for the case in which a flexible, quick, yet reliable actuation of the compressed air supply installation suitable for above applications should be necessary with correspondingly high actuation rates.

A compressed air control device comprising an air dryer is known from EP 1 233 183 B1, in the housing of which a pot-shaped drying container is contained, the interior of which can be connected via the housing to a pressure medium source and also to a port element in the form of a pressure accumulator and/or an air suspension via a valve that is open to said port element, wherein the housing has an air inlet and an air outlet for the compressed air, which, in order to fill the at least one port element, is guided in a direction of flow from the air inlet, through the drying container, and to the air outlet and, for emptying, is discharged from the housing in an opposite direction of flow from the air outlet and through the drying container and the housing. A controllable directional valve is integrated and installed in the housing of the air dryer and, during emptying is used to inlet the air into the housing interior and the drying container. A directional valve controlling the discharge duct is controlled by at least one further controllable directional valve by means of the pressure during emptying, wherein this solenoid valve arrangement is arranged substantially outside the housing of the air dryer.

An air dryer of a compressed air installation, which can be charged by a compressor, has a compressed air storage container and comprises an outlet valve, is known from DE 32 16 329 C2, wherein a pressure retention valve is provided in a return line between the compressed air storage container on the one hand and the container containing a drying agent as well as the outlet valve on the other hand. The outlet valve and a pressure regulator controlling said outlet valve are connected to a hollow rod by means of the container of the air dryer containing the drying agent in such a way that air can pass through. Such solutions and other previously known solutions for an air dryer have proven to be relatively bulky or require much installation space. It would be desirable to design a compressed air supply installation with a bleeding valve arrangement and an air dryer in a manner that is as space-saving as possible.

In accordance with all previously known solutions in which the bleeding valve arrangement is provided in the form of a controllable solenoid valve arrangement, the pneumatic part of the solenoid valve arrangement is closed in an unactivated state of the magnetic part of the pneumatic part of the solenoid valve arrangement; that is to say the solutions provide a normally closed solenoid valve arrangement. In particular with regard to the solution mentioned in DE 35 42 974 A1, it has been found that a normally closed solenoid bleeding valve arrangement can be disadvantageous since an additional pressure-limiting or safety valve often has to be provided in order to ensure reliable function. Since, in the normally closed state, a relay valve of the solenoid valve arrangement is closed, this may lead in some cases to the fact that a valve body adheres to the valve seat and that the switching function of the relay valve of the solenoid valve arrangement is not reliably ensured.

The object of the invention is to specify an apparatus and a method that are improved with respect to the prior art. In particular, an alternative solution to the prior art is to be specified, which overcomes the disadvantages associated with a normally closed solenoid valve. In particular, a bleeding and/or drying performance of the compressed air supply installation is to be improved.

With regard to the apparatus, the object is achieved by a compressed air supply installation of the type mentioned in the introduction, in which the features of the characterizing part of claim 1 are provided in accordance with the invention. With regard to the method, the object is achieved by a method according to the invention in claim 15.

The invention is based on the consideration that, with a normally closed solenoid valve within the scope of a bleeding valve arrangement formed as a solenoid valve arrangement (in particular in the case of an armature or similar valve body adhering in an undesired manner to the valve seat), there is a risk that an overpressure will be produced in the compressed air supply installation in an undesired manner with prolonged air conveyance of the air compression unit. In the worst case scenario, this may also encroach upon a pneumatic installation of a pneumatic system and may lead to damage in the pneumatic installation. This would be extremely disadvantageous in particular in the case of an air suspension installation. A pressure limiter for the compressed air supply installation is advantageously additionally provided, for example in the form of a safety valve or the like. Building on the concept of the invention, a pressure limiter comprising the solenoid valve arrangement may advantageously be provided, for example on a solenoid valve for direct connection of a total compressed air volume or on a relay valve, or may possibly even be omitted. Within the scope of a particularly preferred development, a current-controlled and/or current-adjustable pressure limiter is provided with the normally open solenoid valve arrangement with considerable advantages compared to the previous use of normally closed solenoid valve arrangements. The invention has recognized that the switching effort for operating a normally open solenoid valve is comparatively low. Based on these considerations, the concept of the invention proposes using a solenoid valve arrangement with which, in the unactivated state of the magnetic part, in particular when the magnetic part is de-energized, the pneumatic part is open. Such an arrangement will also be referred to hereinafter as a normally open solenoid valve arrangement. In particular, the pneumatic part of the solenoid valve arrangement actuatable directly via the magnetic part of the solenoid valve arrangement is open in a bleeding line or other branch line of the compressed air supply line between a pressure-side valve port (X) and a bleeding-side and/or control-side valve port (Y, Z).

In a first variant the concept of the invention advantageously comprises a solenoid valve arrangement for direct connection of a compressed air volume. Such a solenoid valve arrangement preferably has only a single bleeding valve or a plurality of bleeding valves. In the case of a single bleeding valve, a compressed air volume can be connected directly by the single bleeding valve. In the case of a plurality of bleeding valves, these may be provided for example as a primary bleeding valve and secondary bleeding valve. The primary bleeding valve and the secondary bleeding valve can be connected simultaneously in succession or individually as required in order to bleed a compressed air volume. Such a directly controlled bleeding solenoid valve arrangement is in particular free from a control valve. It may have a single solenoid valve or a plurality of solenoid valves connecting a compressed air volume, at least one of said valves or a specific number or all of said valves normally being open in accordance with the concept of the invention. In particular, normally open individual-armature or double-armature solenoid valves are suitable.

The concept of the invention is not limited to a directly controlled solenoid valve arrangement.

In a second variant the concept of the invention advantageously comprises an indirectly controlled, normally bleeding arrangement for indirect connection of a compressed air volume, with which a control valve exposed to an overall pressure is provided in order to control a relay valve. In the case of such a normally bleeding arrangement, the pneumatic part of the control valve is open in an inactivated state of the magnetic part of the control valve, and therefore the relay valve is in a piloted state. In the event of an application of pressure, the relay valve opens immediately; the relay valve has consequently proven to be normally open in practice. An exemplary embodiment of a normally bleeding, indirectly controlled bleeding solenoid valve arrangement for a bleeding valve arrangement is illustrated in FIG. 8. Here, an air dryer is blocked with respect to the pneumatic installation by a separate check valve.

In a third variant the concept comprises a solenoid valve arrangement in the form of an indirectly controlled solenoid valve arrangement. This may be a rapidly bleeding arrangement for indirect connection of a compressed air volume, with which a control valve exposed to a partial pressure is provided in order to control a relay valve. In the unactivated state of the magnetic part of the control valve, the pneumatic part of the control valve is open in an indirectly controlled rapidly bleeding arrangement, and therefore the relay valve is in a piloted state. In the event of an application of pressure, the relay valve opens immediately; the relay valve has consequently proven to be normally open in practice. An exemplary embodiment of a rapidly bleeding, indirectly controlled bleeding solenoid valve arrangement for a bleeding valve arrangement is illustrated in FIG. 9. Here, an air dryer is open with respect to the pneumatic installation via a regeneration throttle.

An indirectly controlled valve arrangement (rapidly or normally bleeding) may be understood similarly to a servo-controlled valve arrangement or force-controlled valve arrangement. By contrast, a directly controlled valve arrangement has one or more directly controlled valves, which can be provided in a simple manner.

In principle, the concept of the invention of a normally open solenoid valve arrangement avoids the disadvantage of what is known as a stuck valve, that is to say the disadvantage of a valve body adhering to the valve seat, since, with a normally open solenoid valve, the valve body is not arranged on the valve seat for the longest period of time. In addition, with constant magnetomotive force of a normally open solenoid valve, the valve seat is self-cleaning. This applies in particular to a directly controlled solenoid valve arrangement. The compressed air supply installation is advantageously protected against the external infiltration of soiling.

It has been found that, in any case, separate safety valves may be largely superfluous with the concept of the invention. Even in the case of an undesirably prolonged conveyance of the air compression unit (for example due to a stuck relay at the motor of the compressor), this conveyance reaches the atmosphere due to the normally open solenoid valve arrangement of the bleeding valve arrangement. A state of undesired air conveyance therefore cannot lead to an overpressure load of the compressed air supply installation or even of the pneumatic installation. Even if a fault should occur, an air compression unit that is then no longer controllable advantageously does not convey against a preset maximum pressure. Rather, it only conveys against atmospheric pressure (almost completely in the case of indirectly controlled arrangements and completely in the case of directly controlled arrangements). In addition, in all previously mentioned variants, there is the advantage that, when starting up the air compression unit, non-pressurized start-up is possible due to the normally open solenoid valve arrangement.

In all three previously mentioned variants of a solenoid valve arrangement (that is to say both with a directly controlled bleeding solenoid valve arrangement and with a rapidly bleeding or normally bleeding indirectly piloted solenoid valve arrangement), there is the advantage that these can be closed in an activated manner with each decanting of compressed air in the pneumatic installation, that is to say for example from an accumulator to a bellows valve, that is to say the magnetic part is activated and the pneumatic part is closed. There is thus practically no pressure loss via an air dryer. In particular, if expedient, a separation of the pneumatic installation from the compressed air supply installation may thus be superfluous.

In particular, the pneumatically acting parts, such as the valve as such with a valve body, valve seat, valve seal, valve housing or the like, belong to a pneumatic part of a solenoid valve arrangement. In particular, the electrically and/or magnetically acting parts, such as actuation and control means for the valve with a coil, armature, coil former, control line or the like, belong to a magnetic part of a solenoid valve arrangement.

The invention specifies a pneumatic system with a compressed air supply installation according to the invention.

Further advantageous developments of the invention are to be deduced from the dependent claims and specify in detail advantageous possibilities for implementing the above-explained concept within the scope of the stated object and also with regard to further advantages.

Within the scope of the above-mentioned first preferred developing variant, the normally open solenoid valve arrangement is designed for direct connection of a total compressed air volume, that is to say is preferably embodied in the form of a normally open, directly controlled bleeding solenoid valve arrangement free from a control valve. In a development of the concept of the invention, the pneumatic part of the solenoid valve arrangement in the bleeding line may be opened between a pressure-side valve port (X) and a bleeding-side valve port (Z). For regeneration of the air dryer, a first throttle is advantageously arranged in a compressed air supply line or a branch line connected directly thereto, for example a control branch line or the like. A second throttle is advantageously arranged in a bleeding line or a branch line connected directly thereto, for example a bleeding branch line or the like. The nominal width of the first throttle is preferably less than the nominal width of the second throttle. This advantageously results in the fact that a maximum pressure drop occurs at the air dryer. This in turn results in a comparatively high pressure swing amplitude at the air dryer, which is particularly advantageous for the regeneration of the air dryer within the scope of pressure swing adsorption. A valve for maintaining a residual pressure is preferably arranged in the bleeding line. Within the scope of a preferred development of the first variant, a check valve and/or a relay valve is/are arranged in a bleeding line. A residual pressure function is preferably achieved via a pre-controlled relay piston of the relay valve. The residual pressure function is preferably designed to maintain a residual pressure in particular from 1 to 3 bar (preferably in the range from above 1 bar, in particular at least 1.5 bar) in the system, that is to say in the compressed air supply installation and/or the pneumatic installation. In particular with regard to air suspension installations, such a residual pressure has proven to be advantageous in order to maintain a sufficient residual pressure in the bellows of an air suspension installation. This avoids an undesired folding together or pinching of the bellows.

Within the scope of the above-mentioned particularly preferred developing second variant, the solenoid valve arrangement is to be provided, for indirect connection of a total compressed air volume, with a control valve in order to control a relay valve, which is exposed to a total pressure, that is to say the solenoid valve arrangement is formed in the manner of a normally bleeding, indirectly piloted arrangement. The piloted relay valve advantageously performs a residual pressure function. A separate return valve is thus advantageously superfluous. A pressure limiter with the relay valve can be provided advantageously via a valve spring. In principle, a pressure limiter can be provided in all developing variants of the invention, in particular even on a valve of a solenoid valve arrangement for direct connection of a compressed air volume.

Within the scope of the above-mentioned third particularly preferred developing variant of the invention, the solenoid valve arrangement is provided for indirect connection of a total compressed air volume and has a control valve exposed to a partial pressure for controlling a relay valve, that is to say the arrangement is formed as an indirectly piloted, rapidly bleeding solenoid valve arrangement. With this arrangement too, the piloted relay valve takes on a residual pressure function. A separate check valve is advantageously unnecessary. A pressure limiter can be provided with the relay valve via a valve spring.

In a development of the concept of the invention with the second and third variant, the pneumatic part of the solenoid valve arrangement can be opened in a branch line of the compressed air supply line between a pressure-side valve port (X) and a control-side valve port (Y) in order to pneumatically activate a relay valve in the bleeding line via the branch line.

In addition, it has proven to be particularly advantageous in all previously mentioned developing variants if the solenoid valve arrangement has current-adjustable pressure limitation. It has been found that a pressure limiter, where formed by a spring loading of a valve by means of a valve spring, can only be adjusted within specific limits. On the other hand, it may be advantageous for a sufficiently flexible supply of the pneumatic installation, in particular the air suspension installation, comprising a compressed air supply installation to provide a pressure limiter adjustable over a comparatively large pressure range. In accordance with the development, the solenoid valve arrangement has a current-adjustable pressure limiter. Pressures for reliably filling up an accumulator in an air suspension installation may possibly be very different from pressures for filling up a bellows of an air suspension installation. A continuously current-adjustable pressure limiter enables variably and flexibly adjustable pressure limitation in a range between 10 and 30 bar. In addition, a sufficiently broad tolerance field of pressure limitations can be taken into consideration in such a range. This development can particularly advantageously be implemented since the pneumatic part of the solenoid valve arrangement has an opening pressure that is current-adjustable via the magnetic part. Depending on the operating situation, with a normally open solenoid valve arrangement a maximum pressure of the solenoid valve arrangement can be set by a relatively low current so as to be comparatively low and can be set by a relatively high current so as to be comparatively high. On the one hand, a bellows of an air suspension installation can thus be protected against overload, for example against overload above a pressure from 11 to 13 bar. An accumulator of an air suspension installation can also be protected against overload, for example above a pressure from 20 to 25 bar. A current-adjustable pressure limiter has then in particular proven to be advantageous if it can replace a mechanically acting pressure-limiting valve.

Within the scope of a particularly preferred development, the compressed air supply installation is formed in the manner of a device comprising a housing arrangement, which has a number of housing regions. The compressed air supply installation can thus be segmented as required into an advantageous number of regions, or constructed in a modular manner. A drive is preferably arranged in a first region. The air compression unit that can be driven by the drive is advantageously arranged in a second region. The air dryer and the solenoid valve arrangement are advantageously contained in a third region connected to the second region via a pressure source interface. This division has proven to be useful in particular by arrangement of the first to third regions in a U-shaped arrangement. Interfaces, such as a pressure source interface or a compressed air supply interface or a bleeding interface, can thus preferably be arranged horizontally in the installed position of the installation, generally depending on customer requirement. In principle, this division can also be implemented by arrangement of the first to third regions in an arrangement other than a U-shaped arrangement, for example in a Z-shaped arrangement.

The air dryer preferably has a drying container through which compressed air can flow, said drying container containing a drying agent and having a wall, which forms an indentation free from drying agent. Such a drying container has proven to be particularly suitable for receiving the solenoid valve arrangement at least partially, and preferably completely, in the indentation. On the one hand, the solenoid valve arrangement can thus be protected by the drying container against external influences, and on the other hand the heat developing in the solenoid valve arrangement can advantageously be used for dryer regeneration.

A cover of the drying container is preferably arranged above the indentation. Such a cover preferably has a bleeding region divided at least in part by a seal, in particular a molded seal, into pneumatic lines. A bleeding dome of the air dryer may thus advantageously be arranged at least in part in the region of the housing arrangement. In particular, a bleeding dome of the air dryer is arranged at least in part in the region of a cover, wherein the cover is provided above the indentation in the drying container. In addition, the drying container and/or the cover advantageously forms part of the housing arrangement in a space-saving manner. The cover can be provided particularly advantageously with an integrated seal and/or a check valve for tightly closing the indentation and the solenoid valve arrangement contained therein. Besides a pneumatic function, similar to that of a bleeding dome with pneumatic lines, valves and ports, the cover may also have an electrical or electrical control function. In particular, the cover may be designed to provide pneumatic interfaces, such as the compressed air supply interface and the bleeding interface or a valve in the form of a check valve. In particular, the cover may provide an electrical interface, such as a control interface.

Within the scope of a particularly preferred development, the solenoid valve arrangement has an armature and/or valve seat formed with elastomer and/or metal. A solenoid valve of the solenoid valve arrangement preferably has a valve body or a valve seal and/or a valve seat, which contact an elastomer. In principle, a valve body and/or a valve seat may also contact a metal (an elastomer has additionally proven to be particularly advantageous for sealing a solenoid valve). On the other hand, an elastomer may tend to stick during operation (depending on the proportion of plasticizers), and in unfavorable cases an elastomer may cause a valve body or a valve seal to stick to or freeze onto the valve seat. This may cause the armature of the solenoid valve to become blocked (what is known as a stuck valve). The combination of the present concept of a normally open solenoid valve arrangement and an elastomer provided in accordance with the development on the valve body or armature or valve seal and/or valve seat overcomes these disadvantages. Since, with a normally open solenoid valve arrangement, the elastomer only seals the valve during operation, a stuck valve as mentioned above is reliably avoided.

Exemplary embodiments of the invention will now be described hereinafter on the basis of the drawing. This drawing will not necessarily illustrate the exemplary embodiments to scale, rather the drawing is schematic and/or slightly distorted where appropriate for explanation.

Reference is made to the relevant prior art with regard to supplementations of the teachings directly identifiable from the drawing. Here, it is to be taken into consideration that many modifications and changes concerning the form and detail of an embodiment can be made without departing from the general idea of the invention. The features of the invention disclosed in the description, in the drawing and also in the claims may be essential for the development of the invention both individually and in any combination. In addition, all combinations of at least two of the features disclosed in the description, the drawing and/or the claims fall within the scope of the invention. The general idea of the invention is not restricted to the exact form or detail of the preferred embodiment shown and described hereinafter or restricted to a subject that would be limited compared to the subject claimed in the claims. Where ranges are specified, values within the stated limits are also to be disclosed as limit values and can be used and claimed arbitrarily. For the sake of simplicity, like reference signs are used hereinafter where appropriate for identical or similar parts or parts with identical or similar function.

Further advantages, features and details of the invention will emerge from the following description of the preferred exemplary embodiments and also with reference to the drawing; in the drawing.

Figure 1:
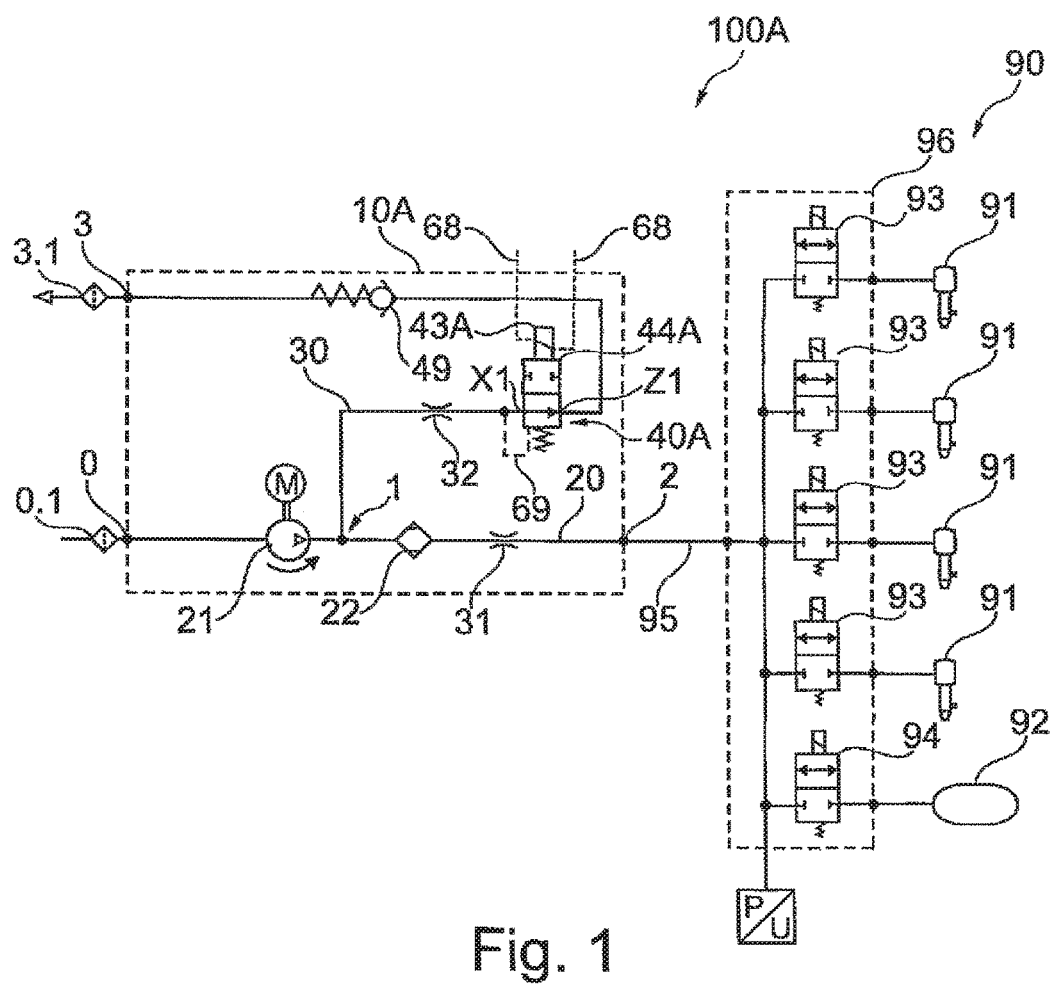
FIG. 1 shows a circuit diagram of a first pneumatic system 100A comprising an air suspension installation and a first compressed air supply installation, specifically comprising a solenoid valve arrangement in the form of a directly controlled bleeding solenoid valve arrangement in accordance with a first developing variant of the invention.
Figure 8:
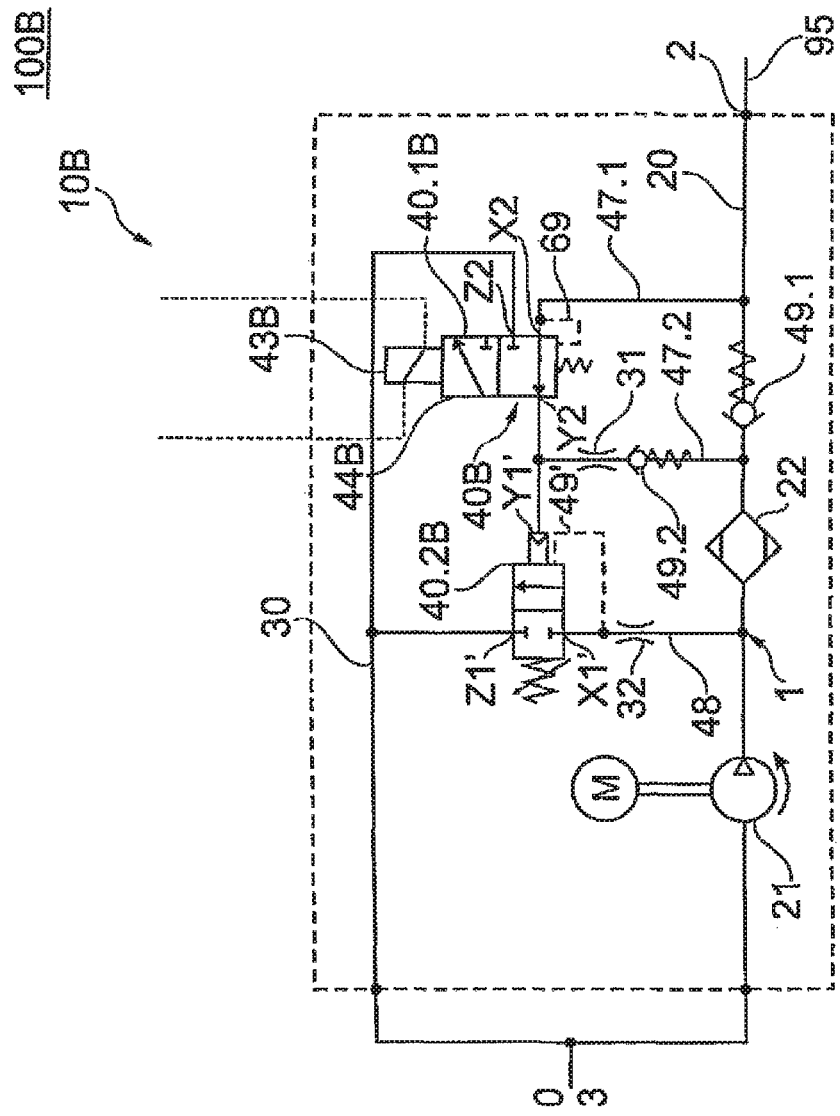
Figure 9:
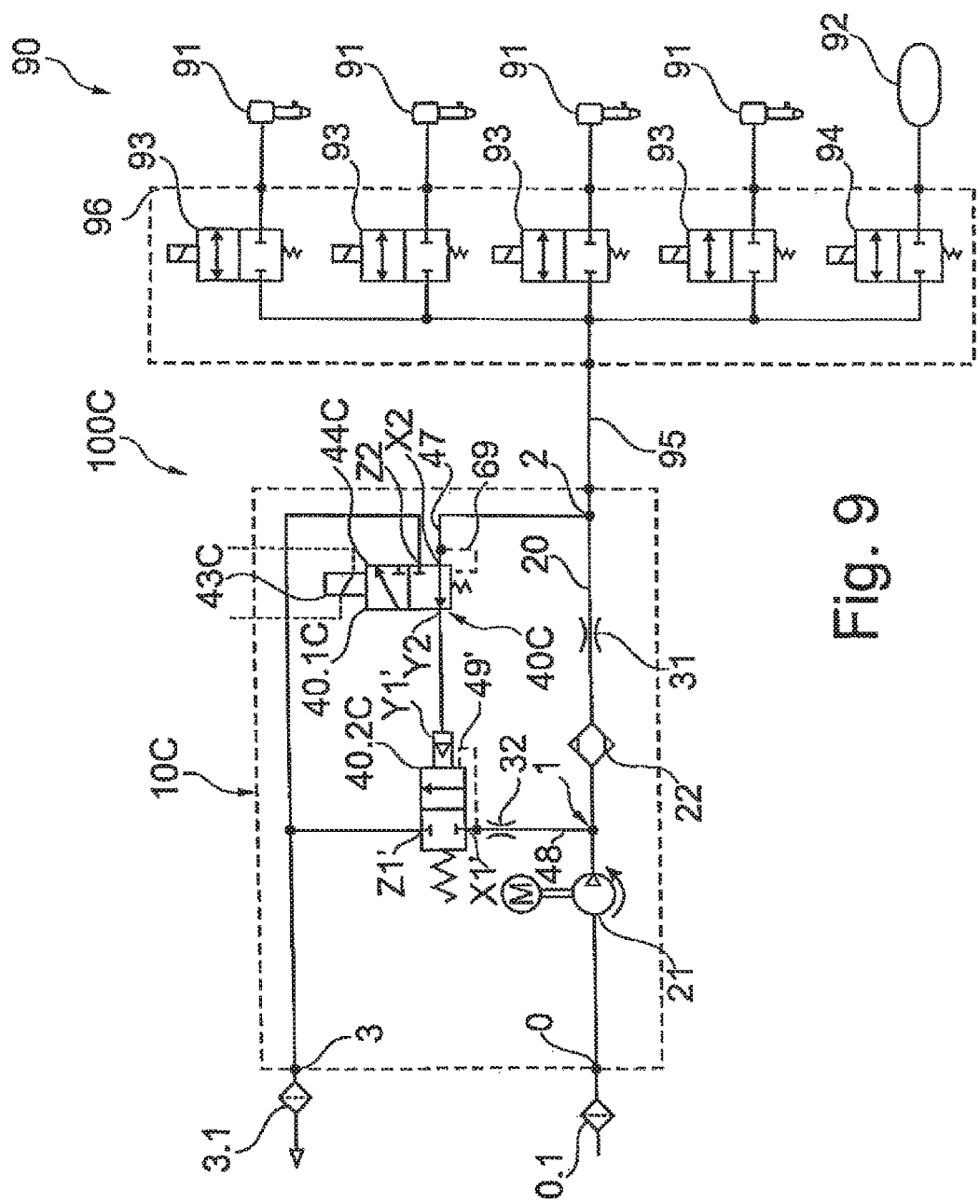

FIG. 5 in image (B) shows an enlarged illustration of a detail of a first modified normally open solenoid valve arrangement in the normally open state for use with a compressed air supply installation in FIG. 1, in contrast to a conventional normally closed solenoid valve arrangement in image (A);

FIG. 6 in images (A) and (B) shows two further modifications of a normally open solenoid valve arrangement for use in a compressed air supply installation in FIG. 1, wherein, in modification (A), a pressure side is arranged below the armature and, in modification (B), a pressure side is arranged above the armature, as in FIG. 5 (B);

FIG. 7 shows a further modification of a solenoid valve arrangement, with which the valve seat is formed as a metal stop and is additionally provided as in FIG. 5 (B) or FIG. 6 (B);

FIG. 8 shows a circuit diagram of a second pneumatic system 100B comprising an air suspension installation and a second compressed air supply installation, specifically comprising a solenoid valve arrangement in the form of a normally bleeding indirectly pre-controlled solenoid valve arrangement in accordance with a second developing variant of the invention, and;

FIG. 9 shows a circuit diagram of a third pneumatic system 100C comprising an air suspension installation and a third compressed air supply installation, specifically comprising a solenoid valve arrangement in the form of a rapidly bleeding, indirectly piloted solenoid valve arrangement in accordance with a third developing variant of the invention.

FIG. 1 shows a pneumatic system 100A comprising a compressed air supply installation 10A and a pneumatic installation 90, here in the form of an air suspension installation. Like reference signs are used where expedient for identical or similar parts or parts having identical or similar function. To this end, the air suspension installation has a number of four "bellows" 91, which are each assigned to a wheel of a vehicle (not illustrated in greater detail), and also has an accumulator 92 for storing rapidly available compressed air for the bellows 91. The bellows 91 and the accumulator 92 are each connected via a normally closed solenoid valve 93, 94 (in the present case in a valve block 96 comprising five valves) to a common pneumatic line forming a gallery 95, which forms the pneumatic connection between the compressed air supply installation 10 and the pneumatic installation 90. The valve block 96 may have different or fewer solenoid valves and/or solenoid valves arranged in a 2-compartment valve block in a modified embodiment. A gallery is quite generally to be understood to mean any type of collecting line, from which branch lines to bellows 91 or a line to the compressed air supply installation 10A depart.

The compressed air supply installation 10A is used to operate the pneumatic installation 90 in the form of the air suspension installation and supplies the gallery 95 thereof via a compressed air port 2. The compressed air supply installation 10A also has a bleeding port 3 and an air supply unit 0 with an intake. The air suspension installation comprising the controllable solenoid valves 93, 94 is arranged downstream of the compressed air port 2 in the filling direction. A filter 3.1 and 0.1 are arranged respectively downstream of the bleeding port 3 in the bleeding direction and upstream of the air supply unit 0.

In a pneumatic connection between the air supply unit 0 and compressed air supply unit 1, the compressed air supply installation 10A additionally has an air compression unit 21 in the form of a compressor, which is provided with compressed air via a motor M driven to supply the compressed air supply unit 1. An air dryer 22 and a first throttle 31, here formed as a regeneration throttle, are also arranged in a pneumatic connection between the compressed air supply unit 1 and the compressed air port 2. The filter 0.1, the air supply unit 0, the air compression unit 21, the compressed air supply unit 1, the air dryer 22 and the first throttle 31 are arranged in this sequence together with the compressed air port 2 in a compressed air supply line 20 leading to the gallery 95.

In a pneumatic connection between the compressed air supply unit 1 and the bleeding port 3 of the compressed air supply installation 10A, a bleeding valve arrangement in the form of a controllable normally open solenoid valve arrangement 40A (in accordance with the concept of the invention) comprising a magnetic part 43A and a pneumatic part 44A is provided for a bleeding port 3 for the draining of air. The solenoid valve arrangement 40A is arranged in a bleeding line 30, forming the pneumatic connection, with a second throttle 32 used here as a bleeding throttle and with the bleeding port 3. In other words, with the normally open solenoid valve arrangement 40A, the pneumatic part 44A is open in the unactivated state of the magnetic part 43A. Specifically, the solenoid valve arrangement 40A is designed in the present case for the direct connection of a compressed air volume. The pneumatic part 44A, actuatable via the magnetic part 43, in the bleeding line 30 of the compressed air supply line 20 is open between a pressure-side valve port X1 and a bleeding-side valve port Z1.

A line portion of the bleeding line 30 on the compressed air port side and forming a pneumatic chamber is advantageously connected to the compressed air supply unit 1 for pneumatic connection of the solenoid valve arrangement 40A to the compressed air supply line 20. As a result, compressed air that is removed before the air dryer 22, that is to say more simply undried air, is bled when the compressed air supply installation 10A is bled via the bleeding line 30.

It can be seen from FIG. 1 that the compressed air supply installation 10A is formed with a solenoid valve arrangement 40A in the form of a directly controlled bleeding solenoid valve arrangement without a control valve and that a direct connection of the total compressed air volume is possible via a control line 68. In the present case, the solenoid valve arrangement 40A provides a single solenoid valve as a bleeding valve. A control valve is not provided. This allows a rapid and flexible bleeding of the pneumatic installation 90 or bleeding of the compressed air supply installation 10A without an additional control valve. Components and installation space can thus advantageously be saved. There are also advantageously no considerable demands on a minimum pilot pressure for operation of the compressed air supply installation 10A. In principle, a multiplicity of operating states, even in respect of the air dryer 22, can thus be implemented in an improved manner with the presently described concept for a compressed air supply installation, since the solenoid valve arrangement 40A is formed with a single normally open solenoid valve, which is activated via the control line 68.

More specifically, the operating principle of the compressed air supply installation 10A is as follows, presented with reference to FIG. 1. The compressed air supply unit 1 is supplied with compressed air by drawing in air via the filter 0.1 and the air supply unit 0 since the air compression unit 21 driven via the motor M compresses drawn-in air. The pneumatic installation 90 in the form of the air suspension installation is supplied with compressed air from the compressed air supply unit 1 via the air dryer 22 and the first throttle 31. To this end, the compressed air supply line 20 of the compressed air supply installation 10A is connected via the compressed air port 2 to the gallery 95 of the pneumatic installation 90.

When reaching the accumulator end pressure in the pneumatic installation 90, in the present case in a pressure range from approximately 15 to 20 bar in the accumulator and 5 to 10 bar in the bellows, the compressed air supply installation 10A is bled. For the solenoid valve arrangement 40A, a greater nominal width dimension is provided for the second throttle 32 than for the first throttle 31 so that a maximum pressure swing amplitude can be produced for the regeneration of the air dryer. This allows advantageous bleeding of the compressed air supply installation 10A and/or regeneration of the air dryer 22.

To fill an accumulator 92, the bleeding line 30 is thus firstly closed by energizing the solenoid valve arrangement 40A using a control current in order to enable a pressure build-up in the accumulator 92. In the present case, the compressed air supply installation 10A can be bled once the accumulator end pressure has been reached, that is to say once the "accumulator filling end" has been reached, by disconnecting the control current for a magnetic part 43A of the normally closed solenoid arrangement 40A. Bleeding can occur without difficulty in the case of vehicle lowering during normal operation by means of the solenoid valve arrangement 40A that is already open (since it is normally open). Here, a regeneration of the air dryer 22 is expediently ensured by means of a suitable pressure drop over the air dryer 22, and a flexible and quick bleeding is expediently ensured by means of the design of the nominal width of the throttles 31, 32.

The compressed air supply installation 10A additionally advantageously has a check valve 49, which in the present case has a residual-pressure-maintaining function. On the one hand, the check valve 49 is used to prevent an entry of contaminants into the compressed air supply installation 10A in addition to the filter 3.1. In addition, the residual-pressure-maintaining function of the check valve 49 is used to maintain a minimum pressure in the compressed air supply installation 10A. Due to the compressed air supply line 20 that is open to the gallery 95 via the throttle 31, the residual pressure is also present for the pneumatic installation 90 in the form of the air filter installation. This residual pressure, in the present case amounting to 1.5 bar, prevents the bellows 91 from sticking together should the compressed air supply installation 10A be bled together with the pneumatic installation 90. Specifically, the walls of the bellows 91 are thus prevented from being pinched or damaged.

In addition, with a pneumatic part 44A of the solenoid valve arrangement 40A, a pressure limiter 69 of the pneumatic part 44A may advantageously be provided, with which the pressure for the solenoid valve arrangement 40A can be limited with measurement of the pressure in the bleeding line 30. A certain variability or tolerance with regard to a pressure limitation can thus be achieved, even with a relatively high operating pressure. A current-controlled pressure limiter 69 is particularly advantageous. In the present case, this is achieved since the switching point of the pneumatic part 44A can be set variably according to the amperage of a control current in the magnetic part 43A. Depending on the vehicle situation, temperature of the system or other pressure-relevant system requirements, the switching point of the pneumatic part 44A can be set in an amperage-variable manner. Due to the current-controlled pressure limiter 69, it is ensured that the gallery pressure does not exceed the static opening pressure of a level control valve formed as a solenoid valve 93 and an inner pressure of a bellows 91. In addition, a pressure measurement can also be taken in the gallery 95 or in the accumulator 92.

A bellows pressure cannot normally impress the solenoid valves 93 and assists a valve spring since, in the present case, a bellows pressure exerts pressure via a valve armature. In the event of pressure fluctuations in the bellows 91, as may occur with poor road conditions or other dynamic influences, the solenoid valves 93 are thus prevented from being pressed. Practically only in the case of an undesirable prolonged conveyance of the air compression unit can a gallery pressure be so high that a bellows valve is pressed and the vehicle is raised undesirably. This could lead to unstable driving conditions. A pressure limiter reliably avoids such a case with installations having closed bleeding circuits. With a normally open circuit as described in the present case, such a risk is avoided per se however, since an air compression unit would generally convey into the atmosphere.

Figure 2:
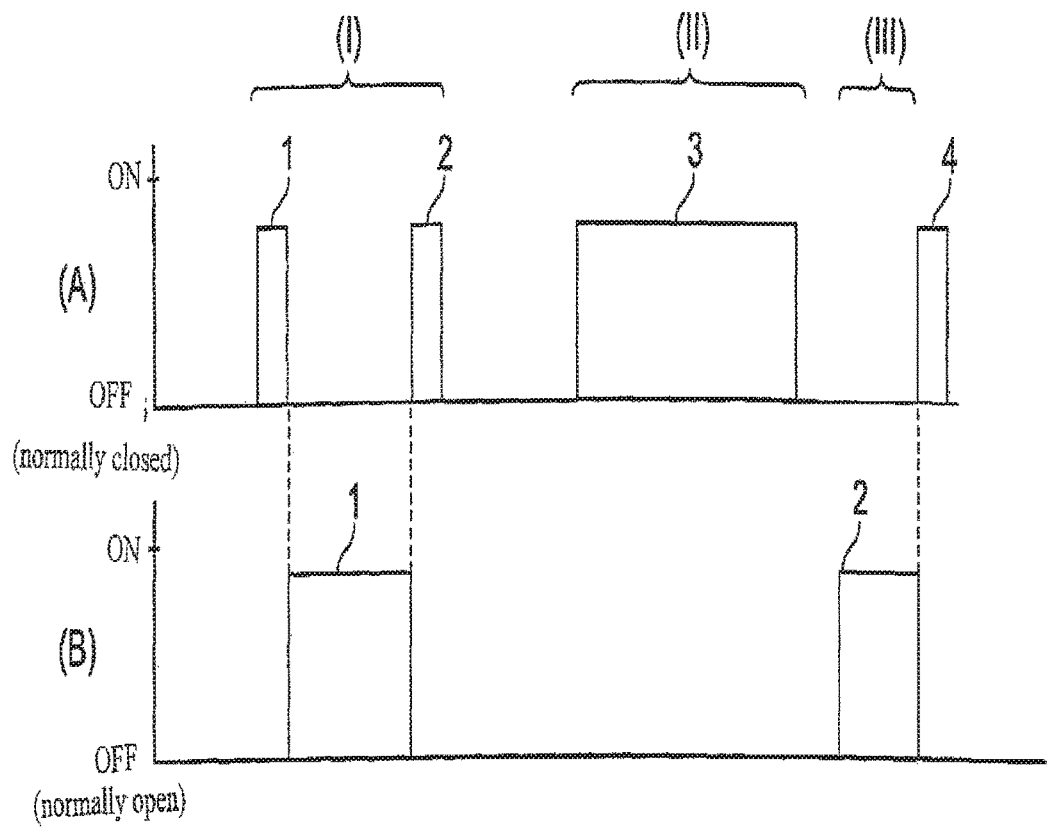
FIG. 2 shows a schematic comparison of energized states (on/off activations) of a normally closed solenoid valve arrangement (A) on the one hand and of a normally open solenoid valve arrangement (B) in accordance with one of the described embodiments on the other hand, and in each case for the operating states (I) conveyance, (II) bleeding/lowering, (III) raising from accumulator.

In image (B), FIG. 2 shows the energized state of the normally open solenoid valve arrangement 40A for three different operating modes—conveyance (I), bleeding or lowering (II) and lifting from the accumulator 92 (III)—in accordance with a preferred embodiment of the invention. For illustrative purposes, this is contrasted as a comparison of the energized state of a normally closed solenoid valve in image (A), which is replaced by the solenoid valve 40A. The actuation state "ON" describes here an energization of a solenoid valve arrangement, and the actuation state "OFF" denotes here a de-energized state of a solenoid valve arrangement.

It is clear from image (B) in FIG. 2 that, for conveyance (I), the normally open solenoid valve arrangement 40A is energized, that is to say closed, from the start of conveyance to the end of the filling process of the bellows 91 or of the accumulator 92 (no. 1). For the operating state (II), that is to say for bleeding or lowering, there is no energization of the normally open solenoid valve arrangement 40A; by opening one of the solenoid valves 93, 94, the pneumatic installation 90 in the form of the air suspension installation can be bled by the normally open solenoid valve 40A and the vehicle body can thus be lowered. The vehicle body can be raised via compressed air stored in the accumulator 92 by opening the solenoid valve 94 and possibly all or some of the solenoid valves 93. The normally open solenoid valve arrangement 40A is energized, that is to say closed, for this operating state (III) (no. 2).

Image (A) shows, by way of comparison, the energization of a conventionally normally closed solenoid valve arrangement. It can be seen that, for the operating state (I), a normally closed solenoid valve arrangement of this type normally has to be opened twice (no. 1 and no. 2), specifically at least in the case of bleeding before conveyance if a residual pressure is to be bled, and also in the case of bleeding after conveyance at the end of the filling process, unless excessive pressure potential may otherwise occur, for example as a result of a pressure exchange between components of a pneumatic system. A normally closed solenoid valve arrangement must also be opened for an operating state (II) by means of lasting energization (no. 3) in order to enable a bleeding or a lowering of the vehicle body. Lastly, in an operating state (III) after lifting of a vehicle body using compressed air from an accumulator 92, a normally closed solenoid valve arrangement has to be energized, that is to say opened, once in order to bleed the compressed air supply installation (no. 4).

It is consequently found that the clock rate of an actuation or activation, that is to say energization or switching frequency, of the normally open solenoid valve arrangement 40A compared to a normally closed solenoid valve arrangement is lower when all operating states (I), (II) and (III) are considered together. It has been found that this is relevant in particular for compressed air supply installations that are to be actuated quickly and in a flexible manner, for example for use in an off-road vehicle or an SUV. For frequently changing operating states (I), (II) and (III), a compressed air supply installation 10A with a normally open solenoid valve arrangement 40A has proven to be particularly advantageous. In addition, with the normally open solenoid valve arrangement 40A, a long-lasting contact between the valve body and the valve seat is advantageously prevented in order to avoid stuck valves.

Figure 3:
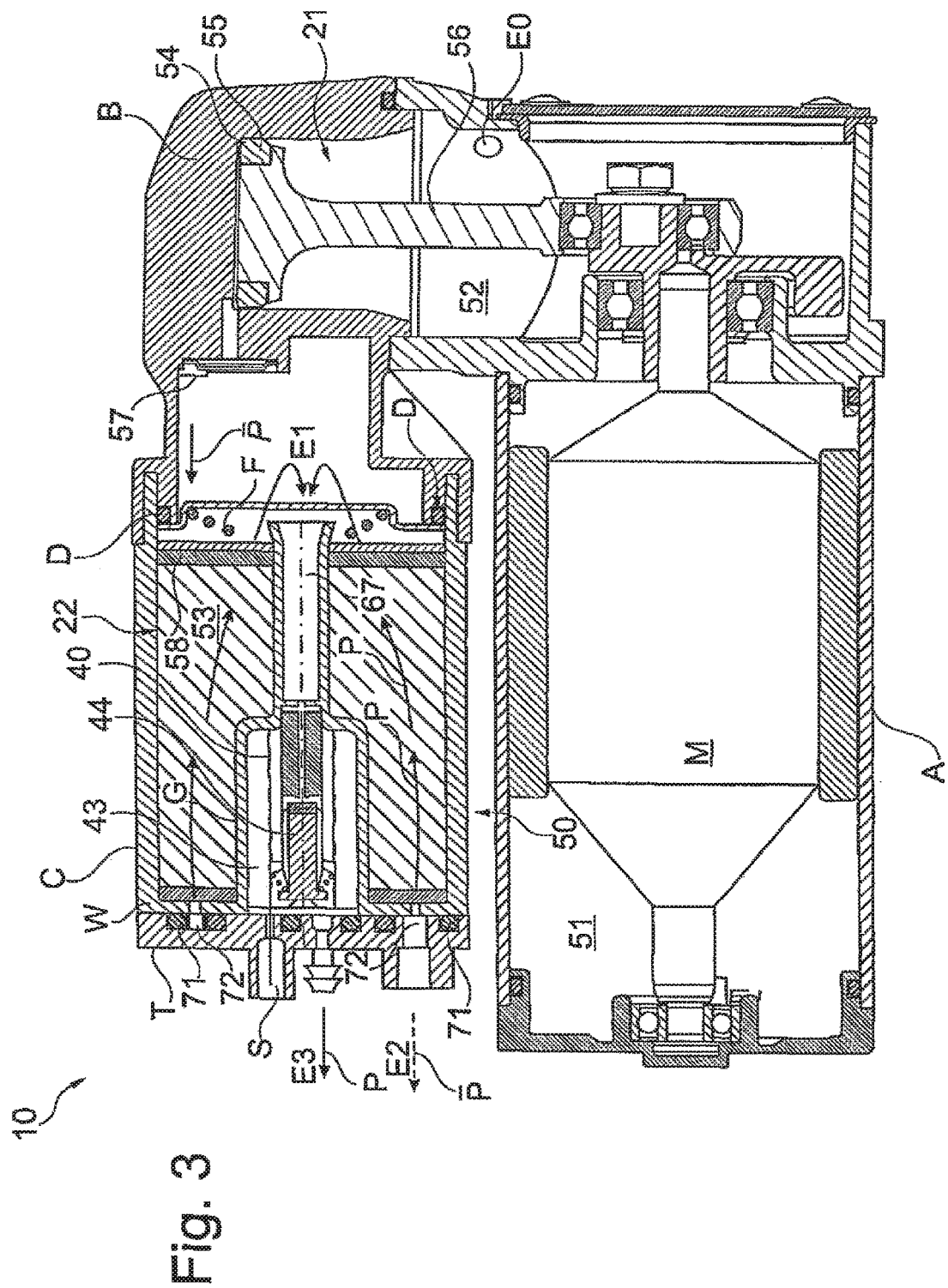
FIG. 3 shows a preferred constructional embodiment of a compressed air supply installation comprising a preferably normally open solenoid valve arrangement for use with the first compressed air supply installation in FIG. 1 with symbolic illustration of a bleeding flow P and an aerating flow $\overline{P}$.
Figure 4:
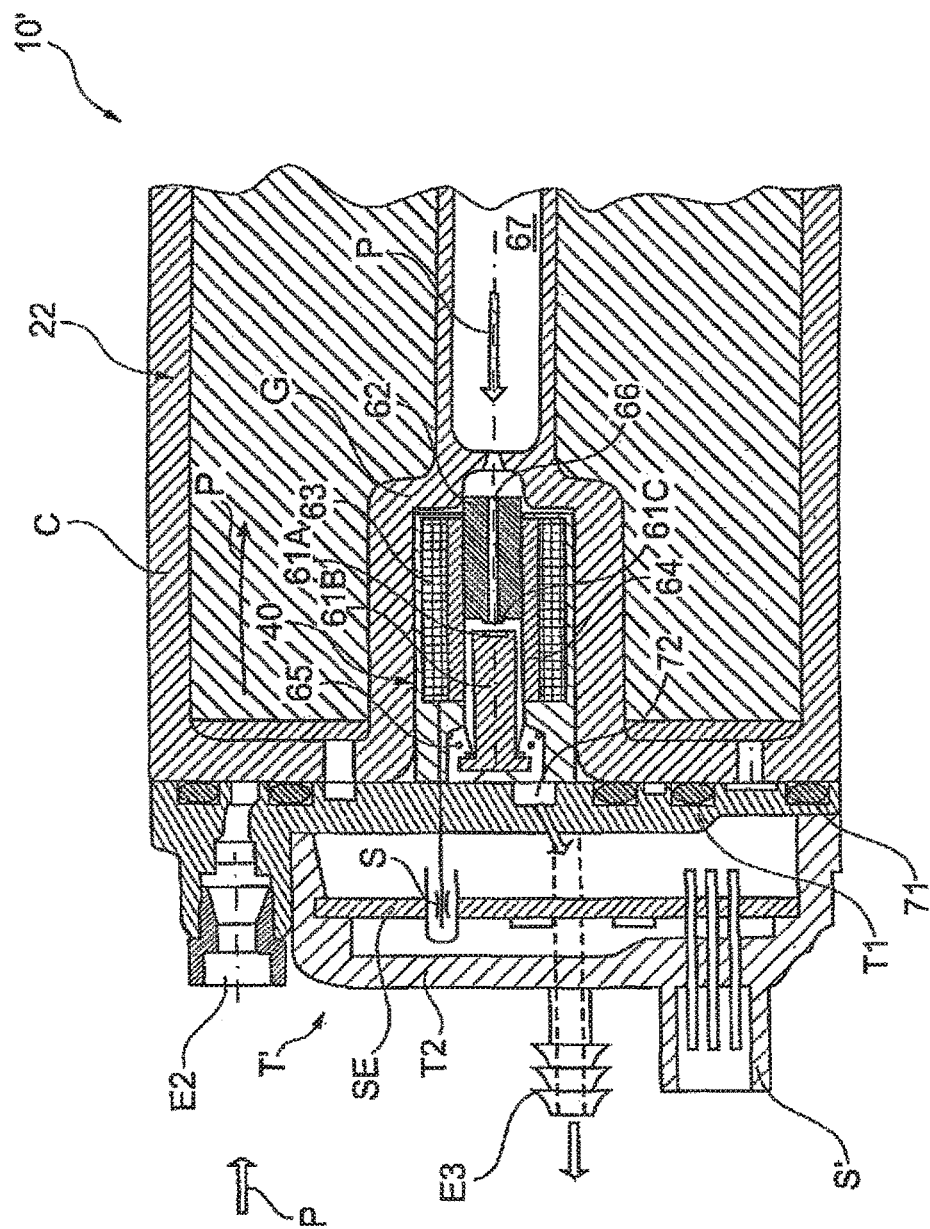
FIG. 4 shows an enlarged view of the solenoid valve arrangement in FIG. 3 in the normally open state with a symbolic bleeding flow P.

Within the scope of a particularly preferred embodiment, the compressed air supply installation 10, 10A, 10B, 10C is formed in the manner of a device comprising a housing arrangement 50, which has a number of regions, wherein a motor M is arranged in a first region 51 and/or the air compression unit 21 that can be driven by the motor M is arranged in a second region 52 and/or the air dryer 22 and the solenoid valve arrangement 40, 40A, 40B, 40C are arranged in a third region 53 connected to the second region 52 via a pressure source interface E1. FIGS. 3 and 4 specifically show two constructionally preferred embodiments of a compressed air supply installation 10, 10' comprising a normally open solenoid valve arrangement 40. The compressed air supply installations 10, 10' are each formed as a device comprising a housing arrangement 50, which has a number of housing regions. A drive in the form of a motor M is arranged in a first region 51, and the air compression unit 21 that can be driven by the motor M is arranged in a second region 52. The air compression unit 21 for this purpose has a piston 55, which is movable to and fro in the compression chamber 54 and which is driven by the motor M via a shaft and a connecting rod 56. Air is fed to the compression chamber 54 via an air supply unit interface E0 of the above-mentioned air supply unit 0. Compressed air located at the output of the compression chamber 54 is transferred via a discharge valve 57 or the like to a pressure source interface E1 for the above-mentioned compressed air supply unit 1. The compressed air is delivered in a third region 53 of the compressed air supply installation 10, 10'. The third region 53 contains the air dryer 22 comprising a drying container 58 and the normally open solenoid valve arrangement 40 (illustrated on a larger scale in the compressed air supply installation 10' in FIG. 4). The housing regions are assigned corresponding housing parts A, B, C, which are optionally sealed with respect to one another via one or more seals D. With the compressed air supply installations 10, 10', a housing part C and a cover T or in FIG. 4 a cover T' closing the housing part C on the base side is assigned to the third region 53.

The air dryer 22 advantageously has a drying container 58, through which compressed air can flow, said drying container containing a drying agent and having a wall W forming an indentation G free from drying agent, wherein the solenoid valve arrangement 40, 40A, 40B, 40C is arranged at least in part, preferably completely, in the indentation G. The third housing part C is formed in the present case by a wall W of the drying container 58 filled with drying granulate and by the cover T, or in FIG. 4 the cover T'. The drying granulate is held at pressure by a spring F in the drying container 58. The wall W in turn, at the base side of the drying container 58, forms an indentation G arranged symmetrically, that is to say in the present case parallel and centrally, with respect to an axis of the drying container 58, said indentation being free from drying agent. The bleeding valve arrangement in the form of the normally open solenoid valve arrangement 40 is housed in the indentation G symmetrically with respect to the axis of the drying container 58. At the base side, the cover T, T' tightly closes the indentation G together with the solenoid valve arrangement 40 located therein.

A cover T, T' of the drying container 58 is advantageously arranged above the indentation (G) and has a bleeding region at least partly divided into pneumatic lines 72 by a seal 71. In the present case, the cover T, T', as part of the housing arrangement 50 of the compressed air supply installation 10, not only receives seals 71 to tightly close the housing part C of the compressed air supply installation 10, 10'. In addition, lines 72, which connect to corresponding apertures in the drying container 58 and are guided in the cover T, T', protrude into the cover T, T' as part of a bleeding dome of the air dryer 22. To form the lines 72, the seals 71 in the cover T, T' are designed as a molded seal. In addition, the cover T, T' is interrupted by interfaces, wherein E2 forms a pressure source interface at the compressed air port and E3 forms a bleeding interface at the bleeding port 3 of the compressed air supply installation 10. The control interface S is used for connection to the above-mentioned control line 68 of the solenoid valve arrangement 40.

In the present case, the normally open solenoid valve arrangement 40 (both the arrangement of the pneumatic part 44 and of the magnetic part 43 of the solenoid valve arrangement 40) is formed in a common valve housing, that is to say in a modular manner, and is arranged in the indentation G in the wall W of the housing part C. With development of the concept of the invention, a particularly compact arrangement of the normally open solenoid valve arrangement 40 in the drying container 58, that is to say specifically in the indentation G formed thereby, can be achieved. In particular, a valve seat and a valve body of the pneumatic part are arranged in the indentation G in this case. The solenoid valve arrangement 40 is thus housed in the drying container 58 in a manner particularly well protected against external influences.

On the whole, a space-saving compressed air supply installation 10, which additionally enables horizontal interfaces, namely S, E0, E1, E2, E3, is provided as a result of the U-shaped arrangement of the first, second and third region 51, 52, 53 and of the assigned first, second and third housing parts A, B, C. In addition, a weight saving is achieved since the outer contour of the drying container 58 and of the cover T, T' of the air dryer 22 is used as part C of the housing arrangement 50.

FIG. 4 shows an enlarged illustration of an embodiment, modified by the cover T', of the air dryer 22 described in FIG. 3 in a compressed air supply installation 10', wherein like reference signs are expediently used for like or similar parts or for parts having like or similar function. In the present case, the arrows show a bleeding flow P from the gallery 95 during bleeding, that is to say in the normally open state of the solenoid valve arrangement 40. As explained, this is arranged completely in an indentation G in the drying container 58, said indentation being formed by the wall W of the housing part C. In the present case, the magnetic part 43 is formed by a coil former 63 and a single armature 61B, which can be activated by the coil former 63 in the event of energization (to close the solenoid valve arrangement 40). It can be seen that the armature 61B, when the coil former 63 is de-energized, is fixed by a valve spring 65 such that a valve seal element 61A attached on the armature 61B is lifted from a valve seat 61C assigned to the valve seal element 61A. The compressed air can escape as a bleeding flow P through a duct 66 forming the throttle 32 in a magnet core 62 and past the armature 61B (that is to say flowing past the coil former 63) through a bleeding dome guided in the cover T', specifically the ducts 72, to the bleeding interface E3 of the bleeding port 3. The armature 61B is arranged in a non-magnetic armature guide tube 64. It can be seen in FIG. 4 that the solenoid valve arrangement 40 in the indentation G in the drying container 58 forms a duct, through which air can flow, through the drying container 58, which has an installation-free free space 67 arranged before the solenoid valve arrangement 40, wherein the free space 67 and the solenoid valve arrangement 40 are arranged axially relative to one another. The free space 67 is therefore part of the above-described bleeding line 30.

In the present case, the check valve 49, not specified here in greater detail and explained with reference to FIG. 1, having a residual pressure function is also incorporated into the cover T'. The check valve 49 is incorporated together with a part of the bleeding dome in the cover T' in a flow-optimized manner such that said check valve is beneficial for flexible and rapid bleeding and aerating of the compressed air supply installation 10 or of the pneumatic installation 90. The cover T' is formed in a modular manner in the present case. To this end, it has a first cover plate T1 for presentation of a pneumatic functionality (specifically the ducts 72, the molded seal 71 and the interfaces E2, E3). The cover T' also has a second cover plate T2 for presentation of an electrical and/or electrical control functionality (specifically the interface S and a control electronics unit SE, which connects the interface S to the port S').

In image (B), FIG. 5 shows a normally open position of the solenoid valve arrangement 40', similar in principle to FIG. 6 (B) and FIG. 7, with a symbolically illustrated compressed air flow Q. Here, the same reference signs as in FIG. 4 have been used for identical or like parts or parts having identical or similar function. The flow Q in FIG. 5 (B) guided in the direction of the bleeding flow P signifies a compressed air flow from the duct 66 to an opening 74 on the magnet core 62 forming the throttle 32 and to two first openings 73 connected to the lines 72 visible in FIG. 4. Here, the armature 61B is pressed against a stop 75 as a result of the spring force of the valve spring 65 (here a compression spring) when the coil former 63 is de-energized. When the coil former 63 is energized, the armature 61B is drawn against the spring force of the valve spring 65 into the coil former 63 so that the valve seal element 61A comes to lie on the valve seat 61C and closes the normally open solenoid valve arrangement 40'. Here, a second opening 76 is released in the stop 75 between the two first openings 73. As can be seen from FIG. 5 (A), the operating principle for the example of a normally closed solenoid valve 400 is different. Here, the armature is pressed via its valve seal element 610A by the spring force of the valve spring 650 against the arrangement formed from a single seat opening 760 and the valve seat 610C and thus closes in the normal state, that is to say the normally closed solenoid valve arrangement 400 closes when the coil former 630 is de-energized. When the coil former 630 is energized, the armature 610 is drawn into the coil former 630 against the spring force of the valve spring 650 so that the valve seal element 610A is raised from the valve seat 610C and releases the seat opening 760. The compressed air of the flow Q can thus flow from a duct 660 into the duct opening 740 forming a throttle, past the armature 610, and through the seat opening 760.

FIG. 6 (A), in contrast to FIG. 6 (B) (identical to FIG. 5 (B)), shows a normally open solenoid valve arrangement 40", with which a pressure built up by the compressed air again of a flow Q in the direction of the bleeding flow P is arranged beneath the armature 61 in the energized, closed state. With the normally open solenoid valve arrangement 40' shown in FIG. 6 (B) and FIG. 5 (B), a pressure of the compressed air in the energized, closed state is arranged above the armature 61B. To this end, FIG. 6 (A) shows a substantially mirrored arrangement of the components of the solenoid valve arrangement 40" compared to the solenoid valve arrangement 40'. The modes of operation of the valve spring 65 in the form of a compression spring and the mode of operation of the coil former 63 have already been described on the basis of FIG. 5 (B).

In principle, the solenoid valve arrangement 40, 40A, 40B, 40C advantageously has an armature 61B and/or valve seat 61C formed with elastomer and/or metal. FIG. 7 shows a modification, which is largely similar in terms of construction to FIG. 5 (B) and FIG. 6 (B) and is practically identical in terms of function, of a normally open solenoid valve arrangement 40''', with which, in contrast to FIG. 5 (B) and FIG. 6 (B), a valve seat 61C is formed as a metal stop, which is arranged opposite a metal valve seal 61A. Here, the valve seal 61A and the valve seat 61C are bent in a curved manner and, with matched shaping of the faces of the valve seal 61A and of the valve seat 61C, manage without an elastomer valve seal element, as is shown in FIG. 6 (B) and FIG. 5 (B).

FIGS. 8 and 9 show two preferred embodiments of a solenoid valve arrangement 40B, 40C, in which a relay valve 40.2B, 40.2C is arranged in the bleeding line 30 to maintain a residual pressure. In the present case, the relay valve 40.2B, 40.2C is designed to hold a residual pressure in the range up to 1 bar, in particular a residual pressure up to 3 bar. The compressed air supply installation 10B, 10C ensures that the pneumatic part 44B, 44C directly actuatable via the magnetic part 43B, 43C is open in a branch line—the compressed air supply line 20—(in accordance with FIG. 9 in a control branch line 47 or in accordance with FIG. 8 in a first branch line 47.1) between a pressure-side valve port X2 and a control-side valve port Y2 of the branch line. In the present case, the pneumatic part 44B, 44C is formed in the manner of a 3/2 valve in the solenoid valve arrangement 40B, 40C and is open in the branch line of the compressed air supply line 20 for pneumatic activation of a relay valve 40.2B, 40.2C in the bleeding line 30. In the unactivated state of the magnetic part 43B, 43C of the control valve 40.1B, 40.1C, the relay valve 40.2B, 40.2C is in a piloted state, in such a way that the relay valve 40.2B, 40.2C opens between a pressure-side valve port X1' and a bleeding-side valve port Z1' with application of pressure.

Specifically, FIG. 8 (for a pneumatic system 100B not illustrated in greater detail comprising the known pneumatic installation 90) shows a compressed air supply installation 10B, in which like reference signs are again used for identical or similar parts or parts having identical or similar function. In particular, the differences from the previously mentioned embodiment of a compressed air supply installation 10A in FIG. 1 and a compressed air supply installation 10C in the subsequent FIG. 9 will be explained hereinafter. The present compressed air supply installation 10B provides a solenoid valve arrangement 40B, which is normally open and is switched in the manner of what is known as a normally bleeding pre-controlled arrangement. As can be seen, the solenoid valve arrangement 40B consists of a normally open solenoid valve as a control valve 40.1B comprising a magnetic part 43B and a pneumatic part 44B. The relay valve 40.2B is part of the pneumatic part 44B. The total pressure of the air pressure volume in the compressed air supply line 20 is applied to the control valve 40.1B, which forwards this as a pilot pressure to the relay valve 40.2B as a normally open embodiment, that is to say in the unactivated state of the magnetic part 43B. This arrangement can be produced with relatively small nominal widths with the control valve 40.1B and yet relatively large nominal widths of the throttle 32 compared to the throttle 31 with the relay valve 40.2B in order to bleed a compressed air volume from the compressed air supply line 20 for bleeding 3 via the branch line 48. In addition, a sufficiently high pressure swing amplitude is ensured for regeneration of the air dryer 22. Due to the throttle 31, connected in parallel, in the second branch line 47.2 designed as a further bleeding line, the total pressure of the de-energized, open control valve 40.1B is applied in the first branch line 47.1 designed as a bleeding line and therefore also to the relay valve 40.2B. The compressed air supply line 20 and the second branch line 47.2 are protected by a first check valve 49.1. The total airflow during a bleeding process is thus diverted into the bleeding line 30 by the control valve 40.1B via the throttle 31 and by the second check valve 49.2 and also by the air dryer 22 and the throttle 32 and the relay valve 40.2B then open in a piloted manner. If the gallery 95 is open, the relay valve 40.2B immediately switches as a result of the control pressure applied to the further control-side valve port Y1'; the control pressure is conveyed to the further control-side valve port Y1' via an open pressure-side valve port X2 and an open control-side valve port Y2 of the normally open control valve 40.1B in the first branch line 47.1. The relay valve 40.2B thus opens the third branch line 48, designed as yet a further bleeding line, with respect to the bleeding line 30 for bleeding 3. On the other hand, the second check valve 49.2 prevents the activation of the relay valve 40.2B via the second branch line 47.2 during conveyance of an airflow from the compressed air supply unit 1 to the compressed air port 2 when the control valve 40.1B is likewise closed, that is to say energized. The first check valve 49.1 also shuts off the gallery 95 with respect to the air dryer 22 in order to avoid undesired filling of the air dryer 22 with changing pressures in the pneumatic installation 90. Here, the control valve 40.1B is likewise closed, that is to say energized.

FIG. 9 shows a pneumatic system 100C comprising a compressed air supply installation 10C and pneumatic installation 90, in the present case in the form of an air suspension installation. The same reference signs as in FIG. 1 have been used for identical or similar parts or parts having identical or similar function. In particular, reference will be made hereinafter to the differences from FIGS. 1 and 8. In contrast to the pneumatic system 100A, the pneumatic system 100C is equipped in the present case with a compressed air supply installation 10C, in which the solenoid valve arrangement 40C (again normally open) is formed in the present case however as a rapidly bleeding, indirectly piloted solenoid valve arrangement 40C. Specifically, this means that the normally open solenoid valve arrangement 40C, for indirect connection of a compressed air volume, has a control valve 40.1C exposed to a partial pressure in order to control a relay valve 40.2C. Here, the control valve 40.1C is formed in the manner of a solenoid valve comprising a magnetic part 43C and a pneumatic part 44C, wherein the relay valve 40.2C is part of the pneumatic part 44C. In the normally open state of the solenoid valve arrangement 40C, the magnetic part 43C of the control valve 40.1C is located in an unactivated state, and the pneumatic part 44C of the control valve 40.1C is open between a valve port X2 on the pressure side and a valve port Y2 on the control side in the control branch line 47 designed as a control line. The control pressure is applied to the control-side valve port Y1' of the relay valve 40.2C in the control branch line 47. The relay valve 40.2C is thus in a piloted state. Depending on design, merely a minimal operating pressure is required to shift the relay valve 40.2C into the open state, that is to say to open said valve between the pressure-side valve port X1' and the bleeding-side valve port Z1' in the third branch line 48 designed as a bleeding line. An advantage of this rapidly bleeding arrangement for the compressed air supply installation 10C is that, due to the relatively small nominal width of the first throttle 31 in the compressed air supply line 20 compared to the larger nominal width of the second throttle 32 in the third branch line 48 designed as a bleeding line, merely a small partial pressure of the total pressure of a compressed air volume in the compressed air supply line 20 is necessary to control the relay valve 40.2C via the control valve 40.1C. Nevertheless, the main compressed air volume is bled via the third branch line 48 and the throttle 32 and also the relay valve 40.2C for bleeding 3. An advantage of this rapidly bleeding solenoid valve arrangement 40C with the compressed air supply installation 10C is that the entire compressed air volume does not have to be guided via a single solenoid valve, but even a small partial pressure of a partial pressure air volume supplied to the control valve 40.1C via the control branch line 47 designed as a control line is sufficient. This design, similarly to a valve arrangement controlled in principle in a force-controlled or a servo-controlled manner, enables an increase in the operating pressure to a comparably high pressure level, and the switching of high compressed air volumes via the relay valve 40.2C is simultaneously made possible. The relay valve 40.2C can be designed with a relatively large nominal width. In addition, the ratio of the smaller nominal width of the first throttle 31 to the larger nominal width of the second throttle 32 is selected such that an effective regeneration of the air dryer 22 during bleeding of the compressed air supply installation 10C is possible. The greater the ratio of the nominal widths, the greater is a pressure swing amplitude, in particular pressure drop, at the air dryer 22 advantageously available for regeneration.

In terms of concept, a common feature between the compressed air supply installation 10B and 10C comprising indirectly piloted bleeding solenoid valve arrangements is that a relay valve 40.2B and 40.2C of a solenoid valve arrangement 40B and 40C respectively is arranged in a "dry" line (that is to say "after" the air dryer 22 in the bleeding direction), specifically in each case in the third branch line 48 leading to the bleeding line 30. There is thus advantageously a relatively low risk of a relay valve 40.2B or 40.2C being damaged, for example frozen or the like, as a result of external influences. Furthermore, both indirectly piloted solenoid valve arrangements 40B, 40C require a minimum pilot pressure in order to be able to release a necessary minimum cross section, namely at least the cross section of the throttle 32, by means of the relay piston of the relay valve 40.2B, 40.2C. To open the relay valve cleanly, a minimum pilot pressure is required. In the case of the rapidly bleeding solenoid valve arrangement 40C, this can be built up dynamically at any rate at the throttle 31 in the event of the regeneration when draining the vehicle. With excessively low air volumes or pilot pressures, a relay piston is not connected. Here, the directly controlled solenoid valve arrangement 40A has advantages, since only a relatively low, or no, pilot pressure is necessary.

In both cases of the indirectly piloted solenoid valve arrangements 40B, 40C, the need for a separate check valve 49 in FIG. 1 is in any case omitted in principle, as is expedient with a directly controlled solenoid valve arrangement 40A in FIG. 1. Rather, a spring-loaded relay valve 40.2B or 40.2C can take on a residual-pressure-maintaining function if a suitable, possibly adjustable, valve spring is provided. In addition, with a relay valve 40.2B, 40.2C, a relay pressure limiter 49' of the relay valve 40.2B, 40.2C may advantageously be provided, with which the pressure for the relay valve 40.2B, 40.2C can be limited with measurement of the pressure in the branch line 48. A certain variability or tolerance with regard to a pressure limitation can thus be achieved, even with a relatively high operating pressure.

In contrast to the cases of indirectly piloted solenoid valve arrangements 40B, 40C, it can be found that a first throttle 31 in the compressed air supply installation 10C can in any case in principle be selected so as to be larger than a first throttle 31 in the compressed air supply installation 10B; the reason for this lies in the fact that a main bleeding flow is not guided via the control valve 40.1C. In principle, compressed air can thus be bled or drained more quickly from a pneumatic system 100C than is the case with a pneumatic system 100B. Nevertheless, good regeneration of the air dryer 22 is achieved, even with the compressed air supply installation 10C, with adaptation, preferably an increase, of the nominal width of the second throttle 32.

A pressure limiter can particularly advantageously provide a current-adjustable pressure limitation for all previously explained solenoid valve arrangements 40A, 40B, 40C. To this end, with a normally open solenoid valve arrangement 40A, 40B, 40C, the pneumatic part 44A, 44B, 44C may have an opening pressure that can be set via the magnetic part 43A, 43B, 43C. By setting a higher or lower current, a maximum pressure can be limited to a higher or lower value as required.

To summarize, the invention relates to a compressed air supply installation 10, 10A, 10B, 10C for operating a pneumatic installation 90, in particular an air suspension installation of a vehicle, said compressed air supply installation comprising:

an air supply unit 0 and an air compression unit 21 for supplying a compressed air supply unit 1 with compressed air, a pneumatic connection, in particular a bleeding line 30, comprising a bleeding valve arrangement in the form of a controllable solenoid valve arrangement 40, 40A, 40B, 40C comprising a magnetic part 43A, 43B, 43C and a pneumatic part 44, 44A, 44B, 44C, and comprising a bleeding port 3 for bleeding air, and a pneumatic connection, in particular a compressed air supply line 20, comprising an air dryer 22 and a compressed air port 2 for supplying the pneumatic installation 90 with compressed air. In accordance with the invention, the pneumatic part 44, 44A, 44B, 44C of the solenoid valve arrangement 40, 40A, 40B, 40C is open in the unactivated state of the magnetic part 43, 43A, 43B, 43C of the solenoid valve arrangement 40, 40A, 40B, 40C.

LIST OF REFERENCE SIGNS (PART OF THE DESCRIPTION)

0 air supply unit
0.1 filter
1 compressed air supply unit
2 compressed air port
3 bleeding port
3.1 filter
10, 10', 10A, 10B, 10C compressed air supply installation
20 compressed air supply line
21 air compression unit
22 air dryer
30 bleeding line
31 first throttle
32 second throttle
40, 40', 40'', 40''', 40A, 40B, 40C solenoid valve arrangement
40.1B, 40.1C control valve
40.2B, 40.2C relay valve
43, 43A, 43B, 43C magnetic part
44, 44A, 44B, 44C pneumatic part
47 control branch line
47.1 first branch line as bleeding line
47.2 second branch line as further bleeding line
48 third branch line as yet a further bleeding line
49 check valve 49' relay pressure limiter of the relay valve 40.2B, 40.2C
49.1 first check valve
49.2 second check valve
50 housing arrangement
51 first region
52 second region
53 third region
54 compression chamber
55 piston
56 connecting rod
57 discharge valve
58 drying container
61B armature
61A valve seal element
61C valve seat
62 magnet core
63 coil former
64 armature guide tube
65 valve spring
66 duct
67 free space
68 control line
69 current-controlled pressure limiter of the pneumatic valve 44A
71 seal
72 line
73 first opening
74 throttle-forming opening
75 stop
76 second opening
90 pneumatic installation
91 bellows
92 accumulator
93 solenoid valve, level control valve for bellows
94 solenoid valve, level control valve for accumulator
95 gallery
96 valve block
100, 100A, 100B, 100C pneumatic system
400 solenoid valve
610 armature
610A valve seal element
610C valve seat
630 coil former
650 valve spring
660 duct
760 seat opening
740 duct opening
A first housing part
B second housing part
C third housing part
D seal
E0 air supply interface, interface
E1 pressure source interface, interface
E2 compressed air supply interface, interface
E3 bleeding interface, interface
F spring
G indentation
M motor
P bleeding flow
P̄ supply flow
Q compressed air flow
S control interface, interface
SE control electronics
T, T' cover
T1, T2 cover plate
W wall
X1, X1', X2 pressure-side valve port
Y1', Y2 control-side valve port
Z1, Z1', Z2 bleeding-side valve port

What is claimed is:

1. A compressed air supply installation for operating an air suspension installation of a vehicle, the compressed air supply installation comprising:
an air supply configured to supply air;
an air compressor;
a bleeding line, comprising:
  a bleeding valve arrangement in the form of a controllable solenoid valve arrangement comprising a magnetic part and a pneumatic part actuatable directly via the magnetic part, and
  a bleeding port for bleeding air; and
a compressed air supply line, comprising:
  an air dryer, and
  a compressed air port for supplying the pneumatic installation with compressed air,
wherein, in an unactivated state of the magnetic part of the solenoid valve arrangement, the pneumatic part of the solenoid valve arrangement is open in the bleeding line between a pressure-side valve port of the bleeding valve arrangement and a bleeding-side valve port of the bleeding valve arrangement.

2. The compressed air supply installation according to claim 1, further comprising at least one of a first throttle and a second throttle,
wherein the first throttle is arranged directly in the compressed air supply line, and
wherein the second throttle is arranged in the bleeding line.

3. The compressed air supply installation according to claim 2, wherein the second throttle is disposed in the bleeding line between the pressure-side valve port of the bleeding valve arrangement and a point on the compressed air supply line between the air compressor and the air dryer from which the bleeding line branches off.

4. The compressed air supply installation according to claim 2, wherein a width of the first throttle is less than a width of the second throttle.

5. The compressed air supply installation according to claim 1, wherein the bleeding valve arrangement does not include and is not connected to a control valve or piloted valve.

6. The compressed air supply installation according to claim 1, wherein a check valve is disposed in the bleeding line is configured to maintain a residual pressure in the bleeding line.

7. The compressed air supply installation according to claim 6, wherein the check valve is configured to maintain a residual pressure of from 1 to 3 bar.

8. The compressed air supply installation according to claim 1, wherein the pneumatic part of the solenoid valve arrangement includes a pressure limiter.

9. The compressed air supply installation according to claim 8, wherein the pressure limiter is a current-controlled pressure limiter such that the switching point of the pneumatic part can be set variably according to an amperage of a control current in the magnetic part.

10. The compressed air supply installation according to claim 1, wherein the bleeding-side valve port of the bleeding valve arrangement is pneumatically connected to the bleeding port.

11. The compressed air supply installation according to claim 1, wherein the bleeding line branches off from the compressed air supply line at a point between the air compressor and the air dryer.

12. The compressed air supply installation according to claim 11, wherein there are no valves disposed in the bleeding line between the point between the air compressor and the air dryer from which it branches off and the pressure-side valve port of the bleeding valve arrangement.

13. The compressed air supply installation according to claim 1, wherein in an activated state of the magnetic part of the solenoid valve arrangement, an armature of the magnetic part of the solenoid valve arrangement is drawn against a spring force of a valve spring such that a valve seal of the pneumatic part of the solenoid valve arrangement that is attached on the armature blocks a pneumatic connection between the pressure-side valve port of the bleeding valve arrangement and the bleeding-side valve port of the bleeding valve arrangement.

14. A pneumatic system, comprising:
a compressed air supply installation for operating an air suspension installation of a vehicle, the compressed air supply installation comprising:
  an air supply configured to supply air;
  an air compressor;
  a bleeding line, comprising:
    a bleeding valve arrangement in the form of a controllable solenoid valve arrangement comprising a magnetic part and a pneumatic part actuatable directly via the magnetic part, and
    a bleeding port for bleeding air;
  a compressed air supply line, comprising:
    an air dryer, and
    a compressed air port for supplying the pneumatic installation with compressed air; and
the air suspension installation of the vehicle,
wherein, in an unactivated state of the magnetic part of the solenoid valve arrangement, the pneumatic part of the solenoid valve arrangement is open in the bleeding line between a pressure-side valve port of the bleeding valve arrangement and a bleeding-side valve port of the bleeding valve arrangement.

15. A method for operating an air suspension installation of a vehicle via a compressed air supply installation, the method comprising:
  supplying a compressor with air via an air supply;
  supplying the air suspension installation of the vehicle with compressed air via a compressed air supply line between the air compressor and a compressed air port, the compressed air supply line including an air dryer;
  draining air from the air suspension installation of the vehicle via a bleeding line between the compressed air supply line and a bleeding port, the bleeding line comprising a bleeding valve arrangement in the form of a controllable solenoid valve arrangement comprising a magnetic part and a pneumatic part actuatable directly via the magnetic part,
  wherein, in an unactivated state of the magnetic part of the solenoid valve arrangement, the pneumatic part of the solenoid valve arrangement is open in the bleeding line between a pressure-side valve port of the bleeding valve arrangement and a bleeding-side valve port of the bleeding valve arrangement.

16. The method according to claim 15, wherein during the supplying the air suspension installation with compressed air via the compressed air supply line or in the event of a compressed air redistribution in the air suspension installation, the magnetic part of the solenoid valve arrangement is energized in such a way that the pneumatic part of the solenoid valve arrangement is closed.

17. The method according to claim 15, wherein during the draining air via the bleeding line, the magnetic part is in the unactivated state.

* * * * *